United States Patent

Pichard

[11] Patent Number: 6,144,865
[45] Date of Patent: Nov. 7, 2000

[54] ENERGY-SAVING METHOD AND DEVICE, AND VEHICLE-MOUNTED ELECTRONIC EQUIPMENT

[75] Inventor: Yann Pichard, Champagne, France

[73] Assignee: U.S. Philips Corporation, New York, N.Y.

[21] Appl. No.: 09/270,445

[22] Filed: Mar. 16, 1999

[30] Foreign Application Priority Data

Mar. 20, 1998 [FR] France .................................. 98 03469

[51] Int. Cl.⁷ ..................................................... H04B 1/38
[52] U.S. Cl. ........................................... 455/574; 455/343
[58] Field of Search ..................... 455/343, 38.3, 455/574, 231, 572

[56] References Cited

U.S. PATENT DOCUMENTS 5,596,315  1/1997  Olds et al. ......................... 340/825.03
5,760,699  6/1998  Saka et al. ............................... 455/343

*Primary Examiner*—Nguyen Vo
*Attorney, Agent, or Firm*—Dicran Halajain

[57] ABSTRACT

The invention relates to an energy-saving method that may advantageously be used in a vehicle-mounted real-time application. Such an application includes sleep-mode and wake-up periods for limiting the power consumption when the application is inactive. It is an object of the invention to avoid unwanted wake-ups due to delays or interruptions by synchronizing the expiration of delays so as to diminish the number of wake-ups.

8 Claims, 2 Drawing Sheets

ENERGY-SAVING METHOD AND DEVICE, AND VEHICLE-MOUNTED ELECTRONIC EQUIPMENT

FIELD OF THE INVENTION

The invention relates to an energy-saving method in an electronic system supplied with power by an accumulator, said system having successive active and inactive periods, the method including:

- a delay step for setting delays having given expiration dates,
- a sleep-mode step for cutting off the power supply to the system during a period of inactivity,
- a wake-up step, started by the expiration of each delay, for again supplying power to said system during a period of activity.

The invention also relates to an energy-saving device for reducing the consumption of supply power by an electronic system having successive periods of activity and inactivity, the device including:

- timing means for setting delays having given expiration dates,
- sleep-mode means for cutting off said power supply during a period of inactivity, and
- wake-up means, started by the expiration of each delay, for again supplying power to said system during a period of activity.

The invention finally relates to vehicle-mounted electronic equipment including an electronic system that has at least a first activity with a considerable real-time constraint and a second activity with a less considerable real-time constraint, and an energy-saving device as described above.

The invention notably applies to mobile radiotelephones supplied with power by rechargeable batteries.

BACKGROUND OF THE INVENTION

U.S. Pat. No. 5,596,315, published Jan. 21, 1997, describes a radio message receiver and a method used by the receiver for carrying out sleep-mode cycles and wake-up cycles with a view to saving on energy of the power supply battery of the receiver.

SUMMARY OF THE INVENTION

It is an object of the present invention to optimize these energy savings to increase the working period of the battery.

For this purpose, a method of the type mentioned in the opening paragraph is characterized in that a precision indication is assigned to said delays and in that said expiration dates are determined by a synchronization step for synchronizing the expiration of the delays as a function of said precision indications.

Similarly, a device of the type defined in the opening paragraph is characterized in that it further includes:

- assigning means, co-operating with the delay means, for assigning a precision indication to said delays,
- synchronization means of said expiration dates for synchronizing the expiration of the delays as a function of said precision indications.

These measures enable to increase the length of sleep-mode cycles and to thus avoid unwanted wake-ups due to the expiration of delays associated to activities not subjected to considerable real-time constraints. On the other hand, the invention provides the assignment of the reduced or even zero-time ranges to the delays associated to activities that have a considerable real-time constraint. This is the case, for example, with activities linked with the communications protocols utilized by the radio interface of pieces of radio communications equipment.

Indeed, the radio communications protocols and, more particularly, the standardized GSM protocols, require a perfect synchronization of the transmission/reception of signaling messages on the radio channel to take notice of the data sent through the network. The wake-up and sleep-mode periods linked with the radio activity are thus perfectly foreseeable. On the other hand, certain activities, such as the management tasks of the user interface or of the battery, do not need to be processed with such great precision with respect to time. Therefore, the invention provides that the wake-ups required by activities that have a small real-time constraint are synchronized with the wake-ups required by the activities that have a considerable real-time constraint.

BRIEF DESCRIPTION OF THE DRAWINGS

These and other aspects of the invention are apparent from and will be elucidated with reference to the embodiments described hereinafter, which constitute a non-limitative example.

In the drawings.

DESCRIPTION OF THE EMBODIMENTS

Figure 1:
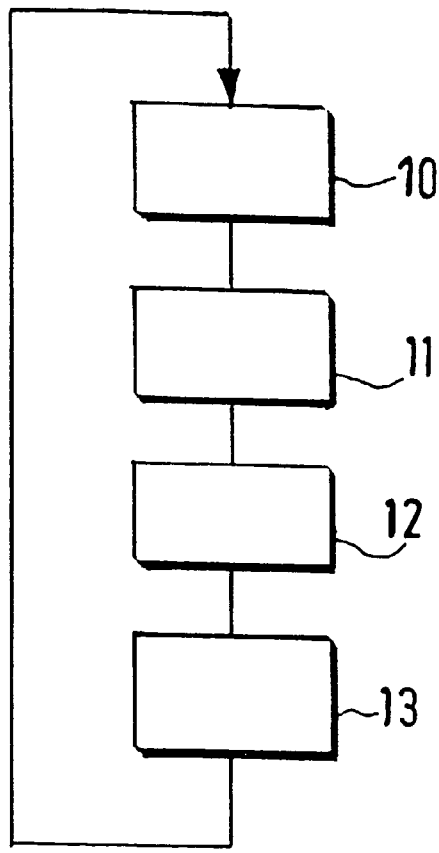
FIG. 1 represents an energy-saving method according to the invention.

The method shown in a diagram in FIG. 1 is subdivided into various successive steps represented by the blocks 10 to 13. It may be implemented in any electronic device including a vehicle-mounted applications system supplied with power by a rechargeable or interchargeable accumulator battery.

It is an object of the method to realize energy savings by "putting the system in the sleep mode", that is to say, by cutting off its power supply when it is inactive and "waking it up", that is to say, by reconnecting it to its power supply, the least often possible for executing a function that cannot wait (that is to say, with a large real-time constraint). The method is thus intended to reduce the number of wake-ups of the system by synchronizing them, so that the system is woken up only once for executing various actions that would have necessitated various independent wake-ups.

When the system is put in the sleep mode, it can only be woken up by particular events which are delays that have expired and interruptions from outside the system, for example, generated by a touch of the key if the device has a keyboard. In a general manner, these events may be put in the same category as the delays whose expiration is determined by the task or the system activity that has triggered it. These delays are automatically diminished even during periods of sleep of the system when the internal clock continues to function.

According to an essential characteristic feature of the invention, there is provided to produce, at the start of each delay, a precision indication relating to the expiration date of the delay. This indication is applied to a specialized management module which centralizes all these data and which calculates the optimum expiration dates of each delay as a function of all the precision indications communicated thereto. Thus, the expiration dates initially specified by each activity at the moment when it started with a precision indication are recalculated by the centralized management module to diminish the number of wake-ups of the system.

The steps of the method are thus the following:

block 10 represents a delay step for setting at least a delay that has a given date of expiration assigned to a precision indication with a view to starting a future action; the precision indication has a time range within which the delay may expire, block 11 represents a synchronization step for synchronizing the expiration dates of the delays as a function of said precision indications; the expiration date of each delay is recalculated as a function of precision indications of all the delays under way in order to assign the same date of expiration to the delays whose time ranges have a common intersection, block 12 represents a sleep-mode step for cutting off the power supply to the circuit during a period of inactivity, block 13 represents a wake-up step triggered by the expiration of a delay for resuming the power supply to said circuit during a period of activity.

This general method may include particular sub-steps that depend on the system in which it is implemented.

Figure 2:
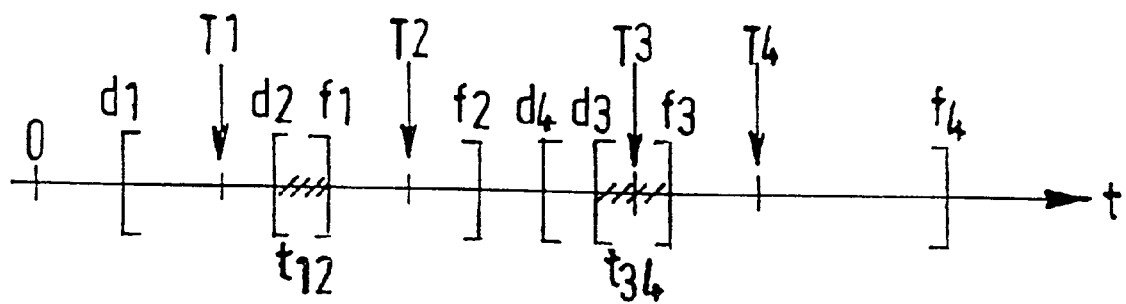
FIG. 2 represents an example of embodiment of the method of FIG. 1.

An example of embodiment of this method will now be described in detail with the aid of FIG. 2 representing, on a time scale running from 0 to t, precision ranges associated to the expiration dates provided for 4 delays T1 to T4. These ranges are shown in the diagram by time intervals defined by square brackets carrying the number of the associated delay and an indication of the start and end of the interval. The square brackets d1 and f1, for example, define thus the time range associated to T1. The vertical arrows point at the theoretical expiration date specified at the start of the delay, before the calculation of the effective date by the synchronization step.

It is observed that the expiration ranges of the delays T1 and T2 have an intersection defined by d2 and f1, and that the expiration ranges of the delays T3 and T4 have an intersection defined by d3 and f3.

The synchronization step will thus include the assignment of an expiration date t12 to both T1 and T2, this date occurring in the interval [d2; f1], and an expiration date t34 to both T3 and T4, this date occurring in the interval [d3; f3].

Figure 3:
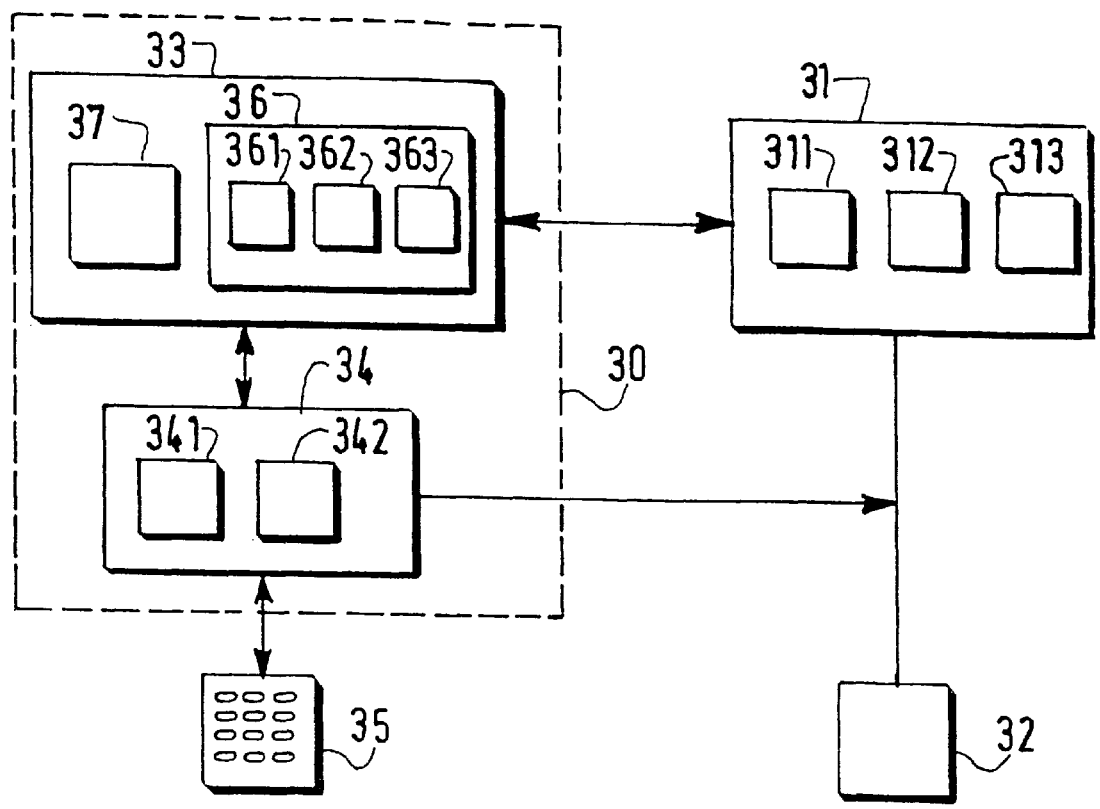
FIG. 3 represents an energy-saving device according to the invention.

The operational diagram represented in FIG. 3 illustrates an energy-saving device 30 that implements the method described above for reducing the energy consumption of an electronic system 31 supplied with power by an accumulator 32.

In the example shown, the system 31 includes three separate applications or activities 311, 312 and 313, which may each trigger delays that may expire during a period of the sleep mode. The energy-saving device 30 is formed by a management module 33 for managing the applications of the system 31 and by a management module of the power supply 34. A user interface element 35, diagrammatically represented as a keyboard, is also shown. The management module 33 comprises a delay management element 36 and a control element 37.

According to an advantageous embodiment of the invention, all the functions of the applications management module 33 may be executed by a real-time core of the type currently used in vehicle-mounted electronic apparatus.

The device 30 will now be described in more detail. The delay management element 36 includes:

delay means 361 controlled by applications 311 to 313 for setting the delays and specifying their expiration date, assigning means 362 cooperating with the delay means 361 for producing a precision indication for each delay, which indication may be stored in the data structure associated to each delay, and synchronization means 363 assuming at the input the precision indications of all the delays under way and producing on the output an effective expiration date for each delay.

The power supply management module 34 comprises:

means for putting activities in the sleep mode 341 by the control element 37 to cut off the power supply 32 during a period of inactivity, and wake-up means 342 which may be triggered either by the expiration of a delay or by an interruption coming from the user interface 35 (notably generated by a touch of the key) to reconnect the power supply 32 in order to execute the task designated by the expiration of the delay or to deal with the interruption.

Figure 4:
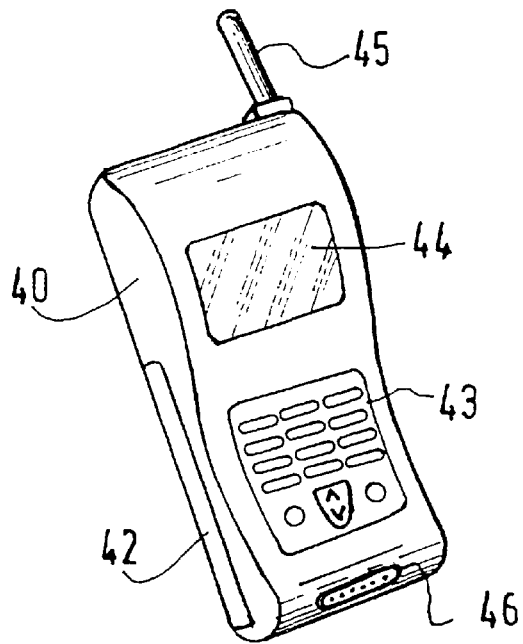
FIG. 4 represents vehicle-mounted electronic equipment according to the invention.

The example of vehicle-mounted electronic equipment represented in FIG. 4 is a radiotelephone operating according to a GSM standard (Global System for Mobile Communications). However, the invention may be applied to any other electronic vehicle-mounted apparatus whose energy consumption is to be reduced and which features considerable real-time constraints.

The housing 40 contains an electronic operating system of the radiotelephone printed on a card (invisible in the Figure). It contains a rechargeable and/or interchangeable battery 42 whose charging level is checked by a battery management element integrated with the system. A user interface formed by at least a keyboard 43 and a screen 44, but also by any accessory that may be connected to the radiotelephone via a connector 46, enables to communicate input/output data with the system via a man/machine interface software layer that produces delays and interruptions. The list of these accessories is not limitative and we will sum up, for example, the most current ones: charger, connector for a computer, automotive kit, hands-free kit, and so on. The device also includes a transceiver antenna 45 for exchanging radio signals with the radiotelephone network. The antenna 45 is connected to a part of the system called radio interface or layer L1 according to the GSM standard and manages the radio activity of the system.

The layer L1 is subjected to considerable real-time constraints, since it permanently takes notice of data transmitted over the radio channels by the network. This is the level having the highest priority of the system. The procedures started by the layer L1 are synchronized with an internal clock. A minimum-precision range affects their expiration dates, which may be assimilated to expiration dates according to the invention. On the other hand, the time constraints of the man/machine interface layer and of the task executed by the charging level control element of the battery are less strict than those of the layer L1.

Consequently, the invention provides a synchronization of the expiration of delays, linked with the man/machine interface applications and with the battery management task, with the expiration dates of the procedures controlled by the layer L1 when these expiration dates lie within the precision ranges of the applications.

What is claimed is:

1. An energy-saving method in an electronic system supplied with power by an accumulator, said system having successive active and inactive periods, the method including:

a delay step for setting delays having given expiration dates, a sleep-mode step for cutting off the power supply to the system during a period of inactivity, a wake-up step, started by the expiration of each delay, for again supplying power to said system during a period of activity, said method being characterized in that a precision indication is assigned to said delays and in that said expiration dates are determined by a synchronization step for synchronizing the expiration of the delays with respect to said precision indications.

2. A method as claimed in claim 1, characterized in that said precision indication has a time range with in which the delay may occur.

3. A method as claimed in claim 2, characterized in that this synchronization step includes assigning the same expiration date to the delays whose time ranges form a non-empty intersection.

4. An energy-saving device for reducing the energy consumption of an electronic system that has successive periods of activity and inactivity, the device including:

delay means for setting delays that have given expiration dates, sleep-mode putting means for cutting off the power supply during a period of inactivity, wake-up means which are triggered by the expiration of each delay, for resuming the power supply to said system during a period of activity, characterized in that said device includes:

assigning means cooperating with the delay means for assigning a precision indication to said delays, and synchronization means of said expiration dates for synchronizing the expiration of the delays as a function of said precision indications.

5. A device as claimed in claim 4, characterized in that said precision indication includes a time range within which the delay may expire and in that said synchronization means permit to assign the same expiration date to the delays whose time ranges form a non-empty intersection.

6. Vehicle-mounted electronic equipment including an electronic system that has at least a first activity with a considerable real-time constraint and a second activity with less real-time constraint and an energy-saving device as claimed in claim 4, said delay means being provided for assigning to said first and second activities separate delays that have a first and a second given expiration date, characterized in that said synchronization means are provided for synchronizing said second expiration date with said first expiration date.

7. Electronic equipment as claimed in claim 6, including a man/machine interface, characterized in that said system is a radio communications system in accordance with a GSM standard (Global System for Mobile Communications) and in that said first activity corresponds to the monitoring activity of the radio channels identified by a layer of the type L1 according to said standard and in that said second activity is generated by the man/machine interface.

8. Electronic equipment as claimed in claim 6, including a power supply battery managed by a control element for controlling the charging level of the battery, characterized in that said system is a radio communications system in accordance with a GSM standard (Global System for Mobile Communications) and in that said first activity corresponds to the monitoring activity of the radio channels identified by a layer of the type L1 according to said standard and in that said second activity is generated by the control element for controlling the charging level of the battery.

* * * * *